United States Patent Office 2,755,106
Patented July 17, 1956

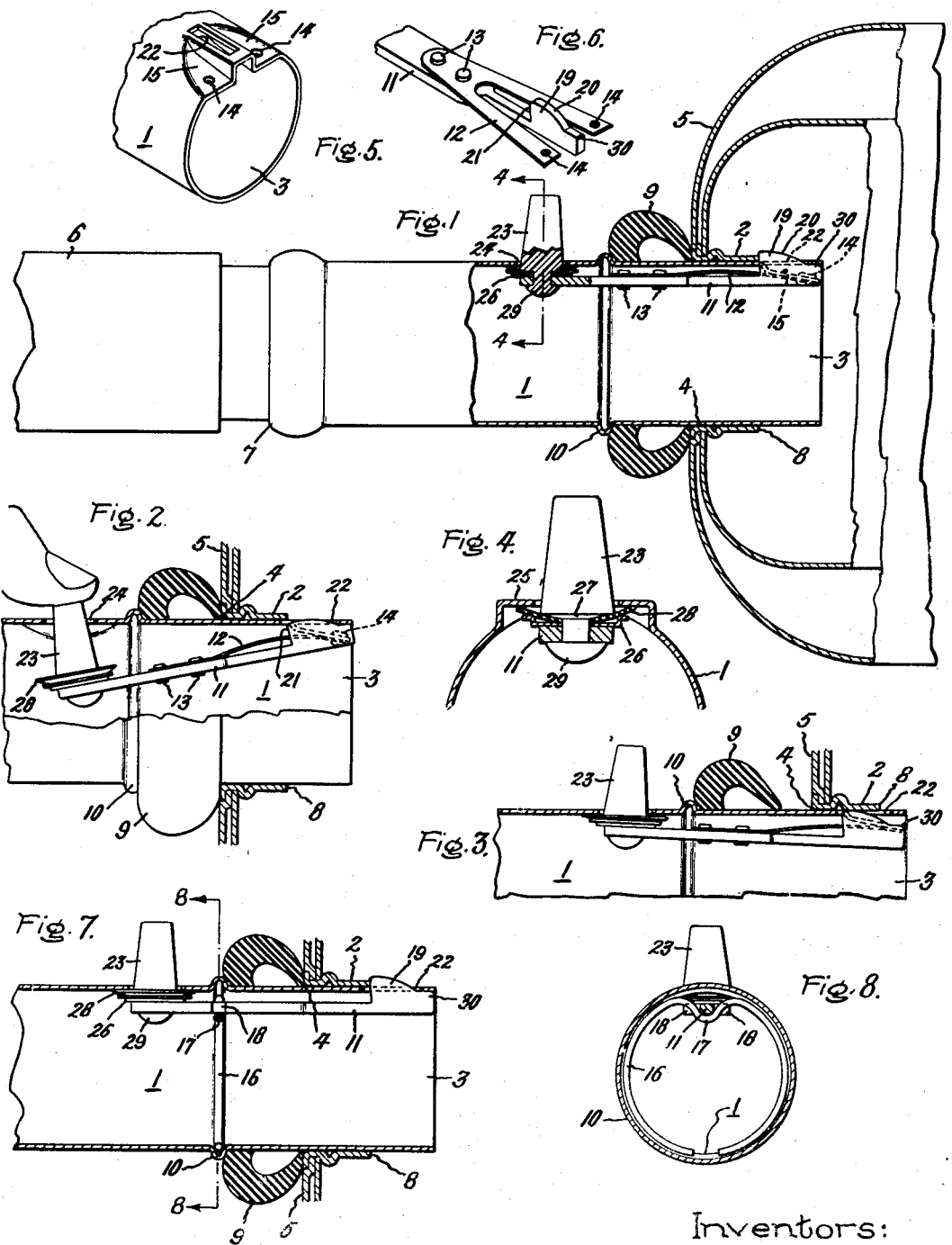

2,755,106

PIVOTED FLOATING LATCH FOR SUCTION CLEANER TUBE OR HOSE COUPLING

Daniel H. Brennan, Cleveland Heights, and Daniel J. Chisholm, East Cleveland, Ohio, assignors to General Electric Company, a corporation of New York Application July 26, 1952, Serial No. 301,064

8 Claims. (Cl. 285—7)

Our invention relates to a tube or hose coupling of the type generally used with suction cleaners. More particularly, our invention relates to a quick-operating, push-button-controlled latch for telescoped tubular sections such as those which are used in the air passageways of suction cleaners.

The coupling of the present invention may be used for tubes, wands or hoses of the type used with suction cleaners, and is useful in connecting a hose or a tube to a cleaner or in connecting sections of tubing or hose together.

In many present designs of tube or hose couplings such as those used with suction cleaners, there is a spring pressed latch which will snap into place to hold two telescoped sections of tube together when the end of one is slid into the end of the other. The latched coupling may be released by pushing a button to release the spring catch and thereafter the tubular sections may be removed from telescoped relation. Our invention relates to a coupling of this general character.

One object of our invention is to provide a spring pressed latch coupling which increases the holding power of the latch member securing the tubular parts together without increasing the difficulty of moving the parts toward latching position.

Another object of our invention is to provide a latch releasing arrangement for such a coupling by which an operator can intentionally disengage the latch with greater ease than with known constructions. Compared to former designs, our invention increases the firmness and reliability of the latch when it is engaged, a feature which is especially useful when there is a resilient air seal used between the two telescoped tube sections. Our improved latch allows a greater pre-load on the resilient air seal when the latch is engaged, but reduces the finger-button pressure necessary to release the latch when it is under such an additional load.

The objects of our invention are obtained generally by providing a double pivoting action of the latch bar or member. With this action, when the tubes are telescoped, the latch bar pivots at one end and allows the pawl of the latch to be easily depressed to engage the other tubular member. When release is required, the other end of the latching bar is moved so that the bar pivots about the pawl end and a much greater force may be applied to disengage the pawl of the latch.

Other objects and further details of that which we believe to be novel and our invention will be clear from the following description and claims taken with the accompanying drawings in which are illustrated two examples of couplings embodying the present invention and incorporating our improved double pivoting latch.

In the drawing Fig. 1 is a longitudinal sectional view of a coupling, shown between the end of a hose and the body of a suction cleaner with the parts in their engaged or coupled position; Fig. 2 is a view similar to Fig. 1 but showing the parts in their pushbutton release position; Fig. 3 is also similar to Fig. 1 but shows the parts as they will appear during movement toward latched or engaged position; Fig. 4 is a somewhat enlarged section on the line and in the direction of the arrows 4—4 of Fig. 1; Fig. 5 is a perspective view of one end of the tubular member which carries the latch in Fig. 1; Fig. 6 is a perspective view of a fragment of the latch and its associated spring according to Fig. 1; Fig. 7 is a view similar to that of Fig. 1 but showing a modification of our invention, and Fig. 8 is a sectional view taken generally along the line and in the direction of the arrows 8—8 of Fig. 7.

As indicated above, our invention may be used to connect together two tubular members such as those used in the air passages of a suction cleaner. As an example of such a coupling, we will show and describe the invention as a coupling between the end of a flexible hose section and the body of a suction cleaner, although obviously the coupling might be made between two sections of hose or tubing.

As shown in the drawing, the two elements to be coupled are an inner cylindrical tube 1 which is to be telescoped into an outer cylindrical tube 2. The inner tube has an open free end 3 while the outer tube may be considered as having an open free end 4, shown in Fig. 1 and other figures as the entrance hole in the end cap 5 of a suction cleaner. When used as a coupling for a hose, the inside tube may be suitably connected to one end of a flexible hose 6 by means of a conventional swivel joint 7 which is not described here because it constitutes no part of the present invention.

Spaced inwardly from the open end 4 of the outer tube 2, is a latching shoulder or recess shown here in the form of an edge 8 on tube 2 spaced from the end 4. In the case of a continuous elongated tube this edge 8 would simply be the edge of a hole in that tube or a latching depression or shoulder on the inner wall of that tube.

For making an air sealed connection between the two tubular members, a resilient annular sealing collar 9 is provided, carried by the outside of the first tube and bearing against the shoulder formed by an annular rib 10 surrounding that tube. The outer or sealing edge of this resilient collar which faces toward the end of the tube and therefore seats against the open edge of the second tube when the tubes are telescoped, is made of sufficient stiffness to resist collapse and breaking of the air seal under the differentials of pressure expected to be encountered.

In order to lock the two tubular members in their assembled and telescoped relation we provide a latch bar 11 having what we call a double pivoting action. This bar, as shown, is carried next to the inner wall of the inside tube and is constrained from movement axially of the tube although permitted to move radially inwardly of the tube by means of a spring member which has an effective supporting connection about midway of the ends of the bar. Two forms of spring members are illustrated, but both forms function to contact the latch bar intermediate its ends and urge it toward the inner wall of the inside tube; in both forms, the spring member is the sole supporting means for the latch bar and it functions to effect a floating mounting for the latch bar. In the form shown in Figs. 1 thru 6, the spring member is in the form of a flat U-shaped spring 12 having its bight riveted or otherwise suitably secured as at 13 to the latching bar and the ends of its arms or legs riveted or otherwise suitably secured to the walls of the inner tube near its end as indicated at the points marked 14. The walls of the tube 1 are deformed on a slant inwardly around the connection points 14 as shown particularly in Fig. 5 at the places marked 15 so that when the parts are assembled, the spring 12 will take a bowed form such as that shown, with the latch bar biased at all times toward the wall of the inner tube. Connection of the spring 12 between the tube and the latch bar prevents axial shifting of the bar in this form.

In the other form of the invention, shown in Figs. 7 and 8, a C-shaped spring 16 is used, and this spring may be held in the inside of the channel formed by the annular rib 10 against movement axially of the tube. Where spring 16 passes under the latching bar, the spring is deformed downwardly as at 17 and the sides of the bar are notched as at 18 to interlock the spring with the bar in order to prevent axial movement of the bar along the tube. When not under pressure from sources outside of the tube, the resiliency of the spring 16 is sufficient to push both ends of the bar 11 radially outwardly toward the wall of the tube.

Near the end of the latching bar close to the open end of the inner tube a projecting detent or pawl 19 is provided, this pawl having a latch guiding surface 20 tapering outwardly from the farthest end to a high point immediately adjacent a latching shoulder surface 21 which is designed to engage with the shoulder 8 on the outer tube 2 when the tubes are telescoped. As will be seen from an inspection of Fig. 3, the pawl will ride on its guiding surface inside of the outer tube as the first tube is slipped inside of the outer tube, with the latching bar rocking about the other end as a pivot. Of course, a hole 22 is provided in the wall of the tube 1 so that the pawl can move therethrough to engage the inside of the tube 2. When the tubes have been telescoped a sufficient distance, the shoulder 21 on the pawl will come opposite the edge of the shoulder 8 on the tube 2 and the spring will push the two shoulders into mutual latching arrangement as shown in Fig. 1.

On the other side of the spring bearing point, at the other end of the latch bar, we provide a pushbutton release 23 which extends through a hole 24 in the tube 1, for manual operation of the latch as shown in Fig. 2. In order to provide a sufficient air seal for the opening 24, a portion of the circumference of the tube is flattened as at 25 (see Fig. 4) on all sides of the button, and a cup-shaped stiff washer 26 of metal or other suitable material is provided on the latching bar under the base of the button. The bottom face of the button immediately above the washer 26 may be made slightly convex as at 27 so that when the sealing washer 28, which may be made of flat resilient stock, is compressed and held between the base of the button and the washer 26, the sealing washer 28 will assure the concave form shown in Fig. 4 with its edges sealing on the flat surface 25. The base of the button 23 may be riveted or otherwise suitably secured as at 29 to the inner end of the latching bar at the same time holding the washers in place. Besides acting as a sealing member, the washer 28 also serves as a bearing between one end of the latching bar and the inside of the tube 1 when the parts are in the position shown in Fig. 3.

When it is desired to release the coupling, the button 23 is pushed inwardly as shown in Fig. 2 and the latching bar is rocked about an end bearing projection 30 located on the outer end of the latching bar just past the base of the pawl 19. It will be noted that this is the second pivot used in moving the latching bar, and because of the mechanical advantage due to rocking the latch about this second pivot, motion of the pushbutton will readily disengage the latching shoulder 21 from the latching shoulder 8 even though these shoulders may be pressed quite tightly together by action of the resilient sealing collar 9. When the latching shoulders are disengaged, the tubular members may obviously be withdrawn from their telescoping relation with respect to each other.

As will be evident from the foregoing description, certain aspects of our invention are not limited to the particular details of construction of the examples illustrated, and we contemplate that various and other modifications and applications of the invention will occur to those skilled in the art. It is therefore our intention that the appended claims shall cover such modifications and applications as do not depart from the true spirit and scope of our invention.

What we claim as new and desire to secure by Letters Patent of the United States is:

1. In a tubular coupling of the type in which the open end of a first tube is telescoped inside the open end of a second tube, and said second tube has a latching shoulder that is spaced inwardly from its open end, a floating latch for holding said tubes in telescoped relation comprising a latching bar carried inside said first tube, a radially outwardly projecting pawl on said bar near the end of the bar nearer the first tube end, said pawl having a latching shoulder spaced from said bar end, a projecting pushbutton on the other end of the bar, said first tube having holes therein through which said pawl and pushbutton project and may be moved, a spring contacting said bar intermediate its ends and forming the sole supporting means for said bar and urging said bar toward the radially inner wall of said first tube, and a pivotal bearing portion on each end of said bar next to the tube, whereby said pawl latching shoulder engages said tube latching shoulder when the tubes are telescoped together, said pushbutton retracts and disengages said pawl latching shoulder from said tube latching shoulder when said pushbutton is depressed, one of said bearing portions is adapted to have pivotal bearing contact with said first tube during telescoping of the tubes together, and the other bearing portion is adapted to have pivotal bearing contact with said first tube when said pushbutton is depressed.

2. A tubular coupling as defined in claim 1 wherein a resilient washer is carried by said bar within said first tube around said pushbutton for sealing the hole which surrounds the pushbutton, said washer also serving as a pivotal bearing between the pushbutton end of the bar and the inner wall of the first tube.

3. A tubular coupling as defined in claim 1 wherein a resilient annular sealing collar surrounds the outside of said first tube and is spaced from the end thereof, said collar being adapted to be compressed against the end of said second tube when the tubes are telescoped together.

4. A tubular coupling as defined in claim 1 wherein a resilient washer is carried by said bar within said first tube around said pushbutton for sealing the hole which surrounds the pushbutton, said washer also serving as a pivotal bearing between the pushbutton end of the bar and the inner wall of the first tube, and an annular sealing collar surrounds the outside of said first tube and is spaced from the end thereof, said collar being adapted to be compressed against the end of said second tube when the tubes are telescoped together.

5. A tubular coupling as defined in claim 1 wherein said first tube has a portion thereof depressed inwardly and said spring comprises a flat strip of flexible material which is substantially disposed between the inner wall of said first tube and said latch bar, said strip being secured at one of its ends to said depressed portion and at its other end to said bar intermediate the ends thereof, said strip being deformed into a bowed shape upon being secured to said depressed portion and said bar.

6. A tubular coupling as defined in claim 1 wherein the first tube has an annular channel formed therein and said spring comprises a C-shaped, resilient member that is mounted in said channel and contacts said bar on its radially inner side and normally urges said bar radially outwardly into contact with said first tube.

7. A tubular coupling as defined in claim 6 wherein said channel is formed by an annular rib, and which further includes an annular sealing collar mounted around said first tube and positioned axially thereon by said rib, said sealing collar being compressed against said second tube when the tubes are telescoped into coupled relationship.

8. A tubular coupling as defined in claim 1 wherein said first tube has a portion depressed inwardly which defines two flat surfaces, said spring comprises a U-shaped strip of flexible material, the bight end of said spring being secured to said bar intermediate its ends, and the legs of said spring being secured to said flat surfaces, and wherein said bar is disposed so as to have a portion thereof located between said legs, whereby portions of said bar are adapted to move between said legs during operation of said latch.

References Cited in the file of this patent

UNITED STATES PATENTS

| | | |
|---|---|---|
| 1,203,630 | Koenig | Nov. 7, 1916 |
| 2,064,397 | White | Dec. 15, 1936 |
| 2,516,907 | Penfold | Aug. 1, 1950 |
| 2,523,770 | Marette | Sept. 24, 1950 |

OTHER REFERENCES

Cawl: Abstract 227,449, October, 14, 1952, 663 O. G. 572.